United States Patent Office 3,171,821
Patented Mar. 2, 1965

3,171,821
RUBBER AND EPOXY RESIN ADHESIVE COMPOSITIONS AND METHOD OF MANUFACTURE
Robert J. Sherman, Detroit, and Richard H. Toth, Wyandotte, Mich., assignors to Chrysler Corporation, Highland Park, Mich., a corporation of Delaware
No Drawing. Filed Jan. 27, 1961, Ser. No. 85,217
5 Claims. (Cl. 260—3)

This invention relates to formulations of epoxy resin and curing agents with rubbers of the styrene-butadiene (SBR) and natural types containing vulcanizing agents and a special plasticizer to render these formulations especially suitable for adhesively securing together a wide variety of structural members of the same or different chemical composition such as glass, metal, plastics, ceramics, wood, cloth, flexible tile, plaster, and concrete. The adhesive bond produced according to the present invention is sufficiently flexible at low temperatures in the range of minus 40° F. and lower to adhere these components together without breakage of the bond and/or the structural members due to internal stresses which may be transmitted from one member through the adhesive to another member due to different degrees of thermal expansion of the members, and/or physical stresses and strains applied to the assembly.

These formulations may be varied in their resin to rubber proportions to give adhesive bonds of either high order adhesion and rubbery consistency, low order adhesion and rubbery consistency, or high order adhesion and rigid consistency. It is obvious, therefore, that these compositions can be adjusted to provide adhesive products which may be sprayed, spread, trowled, brushed, pumped, extruded, calendered, pulverized, poured, die formed, and cast.

A principal object of this invention is to provide curable compositions of essentially SBR and/or natural rubbers compounded with epoxy resins conditioned to be compatible therewith.

A further object is to provide the SBR and/or natural rubber and epoxy resin compositions in powdered form for use in dipping, or spraying operations.

A specific object of this invention is to provide SBR and/or natural rubbers and B-staged epoxy resin formulations containing an alkylaniline plasticizer of the general formula:

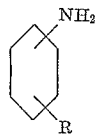

wherein R represents any alkyl chain. This plasticizer in combination with the B-staged epoxy resin renders the rubber and resin components compatible in the formulation to provide the desired adhesion, plasticity, and shock absorption characteristics in the final cured bond. The alkylaniline facilitates the intermediate cure of the epoxy resin and also the rubber-resin compounding operation by inhibiting premature final curing of the epoxy resin. The function of the plasticizer at this stage is probably that of a diluent for the reacting components.

A further object is to control the hardness and shelf life of rubbery-adhesive compositions of natural and/or SBR rubbers compounded with epoxy resins by way of a unique compounding procedure.

The alkylaniline found most suitable for wide application of applicants' adhesive formulations is commercial grade dodecylaniline. It should be noted however that the alkylanilines commercially available may be expected to contain from about 4 to 40 carbons in the alkyl chain. While the lower alkylanilines such as methyl aniline and aniline itself are usable in applicants' invention, their toxicity generally renders them unsuitable for commercial production of the adhesive.

Heretofore various plasticizers have been used with the SBR and natural rubbers but these plasticizers have not been found satisfactory for the low temperature applications contemplated by applicants. Some of the conventional SBR plasticizers that have been commercially used include polyesters, polyethers, mineral oils, polyglycols, and other polar materials, but the plasticizing effect of these materials at low temperatures, down to —40° F., can adversely affect the adhesive properties of applicants' compositions. For example, during the adhesive curing process, mineral oil would be preferentially absorbed by the rubber causing a substantial separation of the resin from the system. Certain of these above plasticizers such as polyethers and polyesters have been used with SBR rubbers also at temperatures around —40° F. with satisfactory results. However, these plasticizers cannot impart the necessary plasticization to applicants' combinations of SBR and/or natural rubbers and epoxy resins while allowing these systems to retain their good adhesive properties.

In applicants' invention a typical and preferred formulation is as follows:

Formula No. 1

| | Parts |
|---|---|
| Buna-S (SBR) or natural rubber | 1000 |
| Philblack (carbon filler and reinforcing agent) | 670 |
| ZnO | 70 |
| Sulfur | 15 |
| Epon 828 | 402 |
| Dodecylaniline | 58.65 |
| DETA (diethylenetriamine) | 12.55 |
| N,N diallylmelamine | 16.75 |
| Tetramethylthiuram monosulfide | 6 |

This formulation used in preparing a heat curable tape was prepared in the following manner:

(A) B-stage resin preparation:
  (1) Place the above weights of epoxy resin, dodecylaniline, diethylenetriamine, and N,N diallylmelamine into a clean mixing container.
  (2) Agitate the mixture slowly and constantly until the exotherm generated by the DETA has raised the mass to a temperature of about 190° F.
  (3) Cool the mass to room temperature before pulverizing, flaking or beading, preparatory to the addition thereof to the rubber portion of the composition.

The softening point of this B-stage resin product should be between 150° F. and 175° F. for optimum processing of the tape. It is noted however that a softening point of between approximately 100° F. and 200° F. may be useful for the contemplated wide variety of uses of the resin as an adhesive additive for resin rubber compositions and as adhesives in general. It is noted that with softening points above 200° F. the compatibility of the rubber and resin is poor.

(B) Blending of the resin and rubber components:
  (1) Place SBR copolymer into a clean Banbury and mix to break up.
  (2) Add zinc oxide and sulfur to the SBR in the Banbury and mix until about 120–125° F. temperature is reached.
  (3) Premix any fillers and reinforcing agents with the B-staged epoxy resin and add to the above at a sufficiently slow rate to prevent "floating" or "pulverizing" of the rubber.
  (4) When all fillers, reinforcing agents, and resin have been mixed into the rubber, the rubber accelerator is added and mixing continued in the Banbury until a homogeneous blend is obtained. The temperature should be approximately between 200° F. and 250° F. to facilitate blending of the components.

This formulation finds exceptional utility in adhesively securing glass in metal channels by means of the extruded or calendered heat curable tape. This material is useful in bonding polar adherents in general.

If the admixture (blending step 3 above) of fillers, reinforcing agents and resin is omitted, a false bodied (hard) material is obtained. For example, in a test sample of Formula I above, mill slab stock produced without the admixture of the B-staged resin and carbon was found to have a hardness reading of approximately 97A durometer at room temperature. After approximately three days this material was calendered and the hardness of the calendered stock was approximately 80A durometer one hour after calendering; 24 hours after calendering the hardness went to 88; 72 hours after calendering the hardness went to 92A durometer. The stock at this hardness is brittle, has low tear resistance and cannot, therefore, be used in many applications such as channel-window assemblies. Being brittle, it has less tendency to wet surfaces to be bonded especially when fast bonding cures are used.

In a test sample of Formula I using the above admixture technique of blending step 3 the mill slab stock came out about 95A durometer at room temperature. After three days, the stock was calendered and the hardness came down to about 58A durometer. After several weeks the hardness had not noticeably changed. This material has the softness required for relatively good tear resistance and good wetting characteristics.

Satisfactory products within the following range of formulations of Chart I have been prepared in the manner described above and found to exhibit satisfactory structural bonding characteristics.

Chart I

|  | Buna-S Rubber | Natural Rubber |
| --- | --- | --- |
| Elastomer (SBR copolymer) | 100 | 100 |
| Fillers and/or reinforcing agents | 0–100 | 0–100 |
| Metal Oxide (ZnO) | 3–10 | 3–10 |
| Vulcanizer (Sulfur) | 1–2 | 1–2 |
| Accelerator (Tuads or Unads) | .5–1.5 | .5–1.5 |
| Epoxide Resin (200 epoxide equiv.) | 5–4,000 | 95–4,000 |
| Coupling Agent, plasticizer and cure modifier (alkylaniline) | .5–1,000 | .5–1,000 |
| Low Temp. Epon Cure Agent (DETA) | .1–120 | .1–120 |
| High Temp. Epon Cure Agent (N,N Diallylmelamine) | .1–600 | .1–600 |

The above chart shows general rubber resin formulations covering products widely ranging in their degree of adhesion and rubbery consistency. Chart II below shows specific formulations of significantly different adhesion and consistency characteristics.

Chart II

|  | High Order Adhesion Rubbery Consistency | |
| --- | --- | --- |
| Buna S Rubber (SBR copolymers) | 1,000 |  |
| Natural Rubber |  | 1,000 |
| Philblack A′ | 670 | 670 |
| Zinc Oxide | 70 | 60 |
| Sulfur | 15 | 35 |
| Epon 828 | 402 | 402 |
| Alkylaniline C–12 | 58.65 | 58.65 |
| DETA | 12.55 | 12.55 |
| N,N Diallylmelamine | 16.75 | 16.75 |
| Mercapto Benzothiazole |  | 5 |
| Tetramethylthiuram monosulfide | 6 |  |

Chart II—Continued

|  | Low Order Adhesion Rubbery Consistency | |
| --- | --- | --- |
| Buna S Rubber | 1,000 |  |
| Natural Rubber |  | 1,000 |
| Philblack A′ | 670 | 670 |
| Zinc Oxide | 70 | 60 |
| Sulfur | 15 | 35 |
| Epon 828 | 50 | 50 |
| Alkylaniline C–12 | 7 | 7 |
| DETA | 1.5 | 1.5 |
| N,N Diallylmelamine | 2 | 2 |
| Mercapto Benzothiazole |  | 5 |
| Tetramethylthiuram monosulfide | 6 |  |

|  | High Order Adhesion Solid Plastic Consistency | |
| --- | --- | --- |
| Buna S Rubber | 100 |  |
| Natural Rubber |  | 100 |
| Philblack A′ | 67 | 67 |
| Zinc Oxide | .7 | 7 |
| Sulfur | 1.5 | 3.5 |
| Epon 828 | 4020 | 4020 |
| Alkylaniline C–12 | 586 | 586 |
| DETA | 125 | 125 |
| N,N Diallylmelamine | 167 | 167 |
| Mercapto Benzothiazole |  | .5 |
| Tetramethylthiuram monosulfide | .6 |  |

The high order adhesion products having rubbery consistency find wide application as structural adhesives having good bonding and low temperature impact resistance and are especially useful in bonding together brittle members which may be subjected to thermal or other types of shock. The low order adhesion products of rubbery consistency find application as sealing and weatherproofing compounds such as protective coatings for roofs and underwater electrical cables, and are particularly useful at low temperatures. The high order adhesion products having a solid consistency may be used for bonding members to polar surfaces such as metals and plastics.

These products may be fluidized by sufficient pulverization at temperatures which render them brittle and used to coat surfaces by dipping them into the fluidized material.

A cycle of 250° F. glass bondline temperature for 30 minutes is recommended to initiate a structural bond between glass and metal surfaces with each of the structural adhesives described in Charts I and II above. A cure cycle of 320±5° F. glass bondline temperature for 15 minutes has been found to produce a satisfactory structural adhesive joint between glass and metal surfaces.

The amine curing system of Formulation No. 1 above includes a low temperature curing amine, diethylenetriamine, and a high temperature curing amine, N,N diallylmelamine. The low temperature curing amine is used to partially cure the epoxy resin and also impart as an incident thereto the necessary viscosity to the thermoplastic material so that it can be handled and stored and subsequently applied to vent windows and other structures which may then be heated as a unit to a temperature sufficient to cure the resin with the high temperature curing N,N diallylmelamine or any other suitable high temperature curing amine such as succinic and other dibasic anhydrides and amine acid salts. Other conventional low temperature curing amines such as amides, cyanoethylated amines, primary polyamines, and polyalkylpolyamines may be substituted for the DETA.

The formulations described above may be considered as high temperature curing adhesives finding utility in applications where heat can be conveniently applied to effect the cure. Chart III below shows several formulations which may be considered as room temperature curing or low heat curing adhesives.

Chart III

| | High Order Adhesion Rubbery Consistency | |
|---|---|---|
| Buna S Rubber SBR | 1,000 | |
| Natural Rubber | | 1,000 |
| Philblack A | 670 | 670 |
| Zinc oxide | 70 | 60 |
| Sulfur | 15 | 35 |
| Monex | 6 | 6 |
| Epon 828 | 402 | 402 |
| Versamid 125 | 200 | 200 |
| Fiber fillers (cotton flock) | 200 | 200 |
| Dodecylaniline | 58.65 | 58.65 |

| | Low Order Adhesion Rubbery Consistency | |
|---|---|---|
| Buna S Rubber SBR | 1,000 | |
| Natural Rubber | | 1,000 |
| Philblack A | 670 | 670 |
| Zinc Oxide | 70 | 60 |
| Sulfur | 15 | 35 |
| Monex | 6 | 6 |
| Epon 828 | 50 | 50 |
| Versamid 125 | 20 | 20 |
| Fiber fillers (cotton flock) | 100 | 100 |
| Dodecylaniline | 7 | 7 |

| | High Order Adhesion Liquids that Set to Solid Plastic Consistency | |
|---|---|---|
| Buna S Rubber SBR | 100 | |
| Natural Rubber | | 100 |
| Philblack A | 67 | 67 |
| Zinc oxide | 7 | 6 |
| Sulfur | 1.5 | 3.5 |
| Monex | .6 | .6 |
| Epon 828 | 4,020 | 4,020 |
| Versamid 125 | 2,000 | 2,000 |
| Fiber fillers (cotton flock) | 100 | 100 |
| Dodecylaniline | 586 | 586 |

DETA may be used at approximately ⅕ the weight level as a substitute for versamid 125 which is a polyamid. Also other primary and substituted secondary amines which function as room temperature cure agents for the epoxies may be used either in conjunction with versamid 125 or in place of it.

It is noted that these room temperature curing adhesives must be refrigerated until cure is desired if it is to be supplied in a one component system with the C-stage curing agent admixed therein. It is obvious that the final curing agent may be added as the adhesive is needed.

Should it be desired to produce a blown or porous elastomeric material using the rubber-resin systems disclosed herein, the conventional blowing agents such as sodium bicarbonate, P,P' oxybis (benzenesulfonylhydrazine) and N,N dinitrosopentamethylenetetramine may be blended in proper proportions into the uncured composition.

In the above compositions:

Epon 828 is a lower molecular weight resin of the so-called commercial "Epon" epoxy resins which are condensation polymers of epichlorohydrin and bisphenol-A and so described at page 436 of The Condensed Chemical Dictionary, 1956 edition (Reinhold Publishing Corp.). As further described at page 20 of chapter 1 of the publication "Epoxy Resins" by Lee and Neville (1957), McGraw-Hill Book Company, Inc. Epon 828 has an average molecular weight of between 350–400, an epoxide equivalency of 175 to 210 and is liquid at room temperature.

"Tuads" and "Unads" are well known rubber accelerator and vulcanizing agents. The chemical composition of "Tuads" is either tetramethylthiuram disulfide or tetraethylthiuram disulfide, and that of "Unads" is tetramethylthiuram monosulfide. Their identity and physical properties are given at page 317 of the Vanderbilt Rubber Handbook (1958 Edition), published by R. T. Vanderbilt Company.

As shown in the Merck Index, 7th edition, published by Merck and Company, Incorporated, Rahway, New Jersey (1960), at page 580, bisphenol A is chemically described as 4,4'-isopropylidenediphenol, or 2,2-bis (4-hydroxyphenyl)-propane. It is also sometimes called bis-(4-hydroxyphenyl)-2,2-propane.

"Versamid 125" is a modifier and curing agent for epoxy resins. It is a liquid thermosetting polyamide resin derived from the condensation of a dimeric fatty acid with a polyamine. It has an amine value between 330 to 360, a Gardner color of 12 maximum, a viscosity at 75° C. of 7 to 9 poises and contains 0.05% maximum by weight of ash.

"Monex" is a rubber accelerator of the chemical composition tetramethylthiuram monosulfide, the same as "Unads." It is described at page 737 of the above-mentioned Reinhold Chemical Dictionary.

Philblack "A" is a high modulus furnace (HMF) carbon black described in Rubber Age, volume 63, No. 1, April 1948, in an article by Sperberg and Barton entitled "Chemical and Physical Properties of Philblack Carbons."

"Alkylaniline C–12" is a mixture of alkylanilines of the general formula

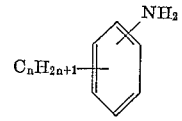

in which the alkyl group averages $C_{12}$, i.e., the average value of $n=12$.

We claim:
1. A curable adhesive admixture comprising rubber in a substantially uncured non-fluid state selected from the group consisting of styrene-butadiene rubbers and natural rubbers and mixtures thereof, a rubber curing agent, a diglycidyl ether of 4,4'-isopropylidenediphenol resin in the "B" stage of cure having a softening point between about 100° F. and 200° F. and an alkylaniline of the general formula

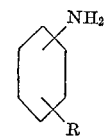

where R is an alkyl chain containing from 4 to 40 carbon atoms, operable for rendering said resin and rubber compatible without advancing cure of said resin to the "C" stage.

2. A curable adhesive admixture as claimed in claim 1 including N,N diallyl melamine operable to cure the resin to the "C" stage.

3. A curable adhesive admixture comprising rubber in a substantially uncured non-fluid state selected from the group consisting of styrene-butadiene rubbers and natural rubbers and mixtures thereof, a rubber curing agent, a diglycidyl ether of 4,4'-isopropylidenediphenol resin, an amine curing agent for said diglycidyl ether operable at room temperature to advance cure of said diglycidyl ether to a "B" stage resin but not beyond a condition corresponding to a softening point between about 100° F. and 200° F., a further curing agent comprising N,N diallyl melamine operable to advance the cure of said resin to the "C" stage at a temperature above about 250° F. and an alkylaniline of the general formula

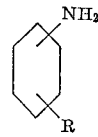

where R is a single alkyl chain containing from 4 to 40 carbon atoms, operable for rendering said resin and rubber compatible.

4. The process of preparing a curable adhesive admixture comprising mixing with a rubber in a substantially uncured non-fluid state and selected from the group consisting of styrene-butadiene rubbers and natural rubbers and mixtures thereof, a curing agent for said rubber, separately mixing a diglycidyl ether of 4,4'-isopropylidenediphenol resin with an amine curing agent operable at room temperature, an amine curing agent operable only at a temperature above about 250° F. and an alkylaniline plasticizing agent for the rubber and resin having the general formula

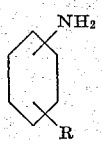

where R is an alkyl chain containing from 4 to 40 carbon atoms, agitating the said separate mixture to effect a reaction with evolution of heat between the resin and room temperature curing agent until the resin is in the "B" stage of cure where it has a softening point between 100° F. and 200° F., cooling the reactant mixture to room temperature and a substantially solid state and pulverizing the cooled product, and thereafter mixing said "B" stage resin reaction product with said rubber mixture at a temperature between about 220° F. and 250° F. until a substantially homogeneous blend is obtained.

5. A curable adhesive admixture comprising 100 parts of rubber in a substantially uncured non-fluid state and selected from the group consisting of styrene-butadiene rubbers and natural rubbers and mixtures thereof, up to 100 parts of carbon black, about 3 to 10 parts of zinc oxide, about 1 to 2 parts of sulfur, about ½ to 1½ parts of rubber accelerator from the group consisting of tetramethylthiuram disulfide, tetraethylthiuram disulfide and tetramethylthiuram monosulfide, about 5 to 4000 parts of uncured diglycidyl ether of 4,4'-isopropylidenediphenol resin, about ½ to 1000 parts of alkylaniline of the general formula where R is an alkyl chain containing from 4 to 40 carbon atoms, about $\frac{1}{10}$ to 120 parts of diethylenetriamine and about $\frac{1}{10}$ to 600 parts of N,N diallylmelamine.

References Cited in the file of this patent
UNITED STATES PATENTS
2,886,473   Schroeder _____ May 12, 1959
FOREIGN PATENTS
524,051   Canada _____ Apr. 17, 1956